(12) United States Patent
Huang et al.

(10) Patent No.: US 11,088,762 B2
(45) Date of Patent: Aug. 10, 2021

(54) PHASE-LOCK-FREE SYSTEM AND METHOD FOR RECEIVING MULTI-MODULATION-FORMAT COMPATIBLE HIGH-SPEED LASER SIGNAL

(71) Applicant: Xi'an Institute of Optics and Precision Mechanics, Chinese Academy of Sciences, Shaanxi (CN)

(72) Inventors: Xinning Huang, Shaanxi (CN); Wei Wang, Shaanxi (CN); Xiaoping Xie, Shaanxi (CN); Yulong Su, Shaanxi (CN); Hui Hu, Shaanxi (CN); Tao Duan, Shaanxi (CN); Duorui Gao, Shaanxi (CN)

(73) Assignee: XI'AN INSTITUTE OF OPTICS AND PRECISION MECHANICS, CHINESE ACADEMY OF SCIENCES, Shaanxi (CN)

(*) Notice: Subject to any disclaimer, the term of this patent is extended or adjusted under 35 U.S.C. 154(b) by 0 days.

(21) Appl. No.: 17/044,293

(22) PCT Filed: Sep. 13, 2018

(86) PCT No.: PCT/CN2018/105464
§ 371 (c)(1),
(2) Date: Jan. 19, 2021

(87) PCT Pub. No.: WO2020/015110
PCT Pub. Date: Jan. 23, 2020

(65) Prior Publication Data
US 2021/0135758 A1 May 6, 2021

(30) Foreign Application Priority Data
Jul. 19, 2018 (CN) .......................... 201810796223.1

(51) Int. Cl.
*H04B 10/67* (2013.01)
*H04B 10/69* (2013.01)
(Continued)

(52) U.S. Cl.
CPC ....... *H04B 10/505* (2013.01); *H04B 10/5161* (2013.01); *H04B 10/67* (2013.01);
(Continued)

(58) Field of Classification Search
None
See application file for complete search history.

(56) References Cited

U.S. PATENT DOCUMENTS 7,539,422 B2   5/2009  Tomaru
10,211,917 B1* 2/2019  Wang ................... H04B 10/541
(Continued)

FOREIGN PATENT DOCUMENTS

CN   102354076 A   2/2012
CN   104317140 A   1/2015
(Continued)

*Primary Examiner* — Li Liu
(74) *Attorney, Agent, or Firm* — Novick, Kim & Lee, PLLC; Allen Xue

(57) ABSTRACT

A phase-lock-free system includes a control instruction unit, a low-noise high-gain optical amplifier, an optical switch, a filter, an optical delay interferometer I, an optical delay interferometer Q, a first balanced detector, a second balanced detector, an anti-coding switch unit, a parallel-serial conversion unit, and a data processing unit. The control instruction unit is connected to the optical switch, the anti-coding switch unit, and the parallel-serial conversion unit, respectively; the low-noise high-gain optical amplifier is connected to the optical switch; the optical switch is connected to the first balanced detector and the second balanced detector by means of the filter, the optical delay interferometer I, and the optical delay interferometer Q,
(Continued)

respectively. This system improves the compatibility of a communication system at a relay node in an existing laser communication network.

15 Claims, 2 Drawing Sheets

(51) Int. Cl.
*H04B 10/50* (2013.01)
*H04B 10/516* (2013.01)
*H04L 7/00* (2006.01)
*H04Q 11/00* (2006.01)

(52) U.S. Cl.
CPC ........... *H04B 10/69* (2013.01); *H04L 7/0075* (2013.01); *H04Q 11/0005* (2013.01); *H04Q 2011/0009* (2013.01); *H04Q 2011/0018* (2013.01); *H04Q 2011/0035* (2013.01); *H04Q 2011/0039* (2013.01); *H04Q 2011/0045* (2013.01)

(56) References Cited

U.S. PATENT DOCUMENTS

| | | | | |
|---|---|---|---|---|
| 10,389,473 | B1* | 8/2019 | Vassilieva | H04B 10/0773 |
| 2006/0013597 | A1* | 1/2006 | Crivelli | H04B 10/6971 |
| | | | | 398/208 |
| 2007/0009264 | A1* | 1/2007 | Kamio | H04B 10/676 |
| | | | | 398/102 |
| 2007/0047972 | A1* | 3/2007 | Ikeuchi | H04B 10/66 |
| | | | | 398/207 |
| 2007/0212079 | A1* | 9/2007 | Ooi | H04B 10/5053 |
| | | | | 398/198 |
| 2008/0199182 | A1* | 8/2008 | Ooi | H04B 10/2513 |
| | | | | 398/81 |
| 2009/0136241 | A1* | 5/2009 | Mo | H04L 27/2014 |
| | | | | 398/188 |
| 2009/0214226 | A1* | 8/2009 | Mizuguchi | H04B 10/677 |
| | | | | 398/202 |
| 2009/0257756 | A1* | 10/2009 | Fukumitsu | H04B 10/677 |
| | | | | 398/202 |
| 2009/0257758 | A1* | 10/2009 | Sasaki | H04B 10/677 |
| | | | | 398/214 |
| 2009/0263144 | A1* | 10/2009 | McKinney | H04B 10/67 |
| | | | | 398/214 |
| 2010/0111540 | A1* | 5/2010 | Caplan | H04B 10/677 |
| | | | | 398/140 |
| 2010/0215357 | A1* | 8/2010 | Westlund | H04B 10/61 |
| | | | | 398/16 |
| 2011/0006825 | A1* | 1/2011 | Fludger | H04L 27/223 |
| | | | | 327/243 |
| 2011/0129230 | A1* | 6/2011 | Zanoni | H04B 10/677 |
| | | | | 398/140 |
| 2012/0082466 | A1* | 4/2012 | Wu | H04B 10/516 |
| | | | | 398/183 |
| 2016/0323039 | A1* | 11/2016 | Sun | H04J 14/026 |

FOREIGN PATENT DOCUMENTS

CN 205754348 U 11/2016
EP 1701186 A1 9/2006

* cited by examiner

PHASE-LOCK-FREE SYSTEM AND METHOD FOR RECEIVING MULTI-MODULATION-FORMAT COMPATIBLE HIGH-SPEED LASER SIGNAL

FIELD

The present disclosure belongs to the field of laser communication, and specifically relates to a phase-lock-free system and method for receiving a multi-modulation-format compatible high-speed laser signal.

BACKGROUND

Laser communication has outstanding advantages of high data rate, strong anti-interference and anti-interception capabilities, and good confidentiality, and has become a main link form of ground backbone network transmission. Commercial 100G optical modules have gradually matured, and 400G optical modules have been displayed at OFC Conference in 2018. Meanwhile, with the continuous verification of the feasibility of space laser link transmission in the world, in recent years, countries around the world have successively launched space information network construction plans based on laser links, such as the "Laser Communications Relay Demonstration (LCRD)" project of NASA, the "European Data Relay System (EDRS)" project of European Space Agency (ESA), the "Japanese Data Relay Satellite (JDRS)" project deployed by the Japan Aerospace Exploration Agency (JAXA). China's satellite "Mozi" launched in 2016 and satellite "SJ-13" launched in 2017 are also equipped with laser communication terminals.

Whether it is a ground large-capacity optical transmission backbone network or a space high-speed laser communication system, different access terminals will select different data modulation formats according to their own data transmission needs. For example, a system structure of an intensity modulation (IM) format is the simplest, but at the same time, requirements for optical power are higher for a receiving system. The sensitivity of a receiving system of a binary phase modulation format (BPSK (Binary Phase Shift Keying), DPSK (Differential Phase Shift Keying)) is reduced by half compared with that of an IM system, but a balanced detection technology is required. A higher-order modulation format (QPSK (Quaternary Phase-Shift Keying), DQPSK (Differential Quaternary Phase-Shift Keying)) can transmit more data at a same symbol rate, but at the same time, the system complexity will increase, and requirements for the optical signal-to-noise ratio is higher for a receiving system.

In an existing laser communication system, a single laser terminal on a relay node can only support the reception of a laser signal with a specific modulation format. When laser links in different modulation formats are converged to a relay node of a laser information network, in an existing receiving method, a corresponding receiving system needs to be equipped for each modulation format to achieve data demodulation. A single-system laser signal reception mode at the relay node limits the compatibility and scalability of a high-speed laser information network node. Meanwhile, in order to support multiple high-speed laser signal relays at the relay node, a separate laser communication terminal needs to be allocated for each communication system, and the cost for the system performance upgrade and resource costs are high.

SUMMARY

In order to overcome the problems of limited network compatibility and poor scalability caused by a relay node only supporting a single laser communication system in an existing laser information network, the present disclosure proposes a phase-lock-free system and method for receiving a high-speed laser signal compatible with mainstream multi-modulation formats in laser communication systems such as IM, BPSK, DPSK, QPSK, and DQPSK, which can significantly improve the compatibility of a communication system at a relay node in an existing laser communication network, and reduce the price for the system performance upgrade and resource costs.

The Specific Technical Solution of the Present Disclosure

The present disclosure provides a phase-lock-free system for receiving a multi-modulation-format compatible high-speed laser signal, including a control instruction unit, a low-noise high-gain optical amplifier, an optical switch, a filter, an optical delay interferometer I, an optical delay interferometer Q, a first balanced detector, a second balanced detector, an anti-coding switch unit, a parallel-serial conversion unit, and a data processing unit;

the control instruction unit is connected to the optical switch, the anti-coding switch unit, and the parallel-serial conversion unit, respectively;

the optical delay interferometer I and the optical delay interferometer Q are arranged in parallel;

a high-speed laser signal is input to the optical switch through the low-noise high-gain optical amplifier;

the optical switch includes a first output port, a second output port, and a third output port, wherein the first output port is connected to the filter, the second output port is connected to the optical delay interferometer I, and the third output port is connected to the optical delay interferometer I and the optical delay interferometer Q respectively through a coupler;

the filter is connected to one input port of the first balanced detector, two output ports of the optical delay interferometer I are connected to two input ports of the first balanced detector, and two output ports of the optical delay interferometer Q are connected to two input ports of the second balanced detector;

the first balanced detector and the second balanced detector output electrical signals sequentially through the anti-coding switch unit, the parallel-serial conversion unit, and the data processing unit; and a phase shift difference between the optical delay interferometer I and the optical delay interferometer Q is $$\frac{\pi}{2}.$$

Further, the system further includes a loop control unit, wherein the data processing unit is respectively connected to the optical delay interferometer I and the optical delay interferometer Q through the loop control unit.

Further, the above low-noise high-gain optical amplifier is a 1550 nm band optical amplifier with a noise coefficient ≤4.5 dB and a gain ≥40 dB;

the above optical switch is a 1×3 type 1550 nm band optical switch device, and is capable of transparently transmitting an input optical signal to any designated output port according to a modulation format instruction;

the above filter is a 1550 nm band pass optical filter with tunable center wavelength and filter bandwidth;

the above optical delay interferometer I and optical delay interferometer Q are 1550 nm band 1-bit optical delay interferometers; and the above first balanced detector and the second balanced detector are 1550 nm band optical balanced detectors.

On the basis of the structural description of the phase-lock-free system for receiving the multi-modulation-format compatible high-speed laser signal, a method for receiving a signal using the system is introduced, including the following steps:

【1】 a control instruction unit sends corresponding modulation instructions to an optical switch, an anti-coding switch unit, and a parallel-serial conversion unit according to modulation formats of required high-speed laser signals;

【2】 a low-noise high-gain optical amplifier performs low-noise-coefficient and high-power-gain optical power enhancement processing on input high-speed laser signals;

【3】 after receiving the modulation instruction generated by the control instruction unit, the optical switch selects output ports for the high-speed laser signals processed in the step 【2】 and transparently transmits the high-speed laser signals;

【4】 for the high-speed laser signals in different modulation formats output by different output ports in the step 【3】, a filter or an optical delay interferometer I or an optical delay interferometer Q is selected for information demodulation;

【5】 the high-speed laser signals in different modulation formats after demodulation in the step 【4】 are received, and a first balanced detector or a second balanced detector is selected for photoelectric conversion on the high-speed laser signals to form a high-speed electrical signal;

【6】 after receiving the modulation instruction generated by the control instruction unit, the anti-coding switch unit performs anti-coding judgment on the high-speed electrical signal generated in the step 【5】 and transmits the high-speed electrical signal subjected to anti-coding judgment to the parallel-serial conversion unit;

【7】 after receiving the modulation format instruction generated by the control instruction unit, the parallel-serial conversion unit performs parallel-serial conversion judgment on the high-speed electrical signal and transmits a high-speed electrical signal subjected to parallel-serial conversion judgment to a data processing unit for processing; and 【8】 the data processing unit performs clock extraction, data shaping and the like on the high-speed electrical signal generated in the step 【7】, and then outputs a demodulated high-speed electrical signal with good quality.

Preferably, the above method further includes a step 【9】, i.e., loop control, wherein a loop control unit uses the high-speed electrical signal generated in the step 【7】 as a feedback control signal to control phase shifts of the optical delay interferometer I and the optical delay interferometer Q so that a phase shift difference between the optical delay interferometer I and the optical delay interferometer Q is maintained to be $\pi/2$ all the time.

A specific process of the output port selection in the above step 【3】 is as follows:

if the received modulation format instruction is IM, a first output port is used for outputting; if the received modulation format instruction is one of BPSK and DPSK, a second output port is used for outputting; and if the received modulation format instruction is one of QPSK and DQPSK, a third output port is used for outputting.

A specific selection condition for the information demodulation in the above step 【4】 is as follows:

if a modulation format is an IM modulation format, band-pass filtering is performed through the filter;

if a modulation format is one of BPSK and DPSK modulation formats, 1-bit delay interference demodulation is performed through the optical delay interferometer I;

if a modulation format is one of QPSK and DQPSK modulation formats, high-speed laser signals enter the optical delay interferometer I and the optical delay interferometer Q through a coupler, and 1-bit delay interference demodulation is performed respectively.

A selection condition for the photoelectric conversion in the above step 【5】 is as follows:

if an IM modulation format is received, photoelectric conversion is performed through an input port of the first balanced detector;

if one of BPSK and DPSK modulation formats is received, photoelectric conversion is performed through the first balanced detector; and if one of QPSK and DQPSK modulation formats is received, photoelectric conversion is performed through the first balanced detector and the second balanced detector.

A specific process of the anti-coding judgment in the above step 【6】 is as follows:

if a received modulation format instruction is one of BPSK and QPSK, "exclusive OR" logic-based differential anti-coding processing is performed, and then output is performed; and if the received modulation format instruction is one of IM, DPSK and DQPSK, transparent transmission is performed.

A process of the parallel-serial conversion judgment in the above step 【7】 is as follows:

if the received modulation format instruction is one of QPSK and DQPSK, two paths of input parallel high-speed electrical signals are converted into one path of serial high-speed electrical signal; and if the received modulation format instruction is one of IM, BPSK and DPSK, transparent transmission is performed.

The Advantages of the Present Disclosure (1) the system and method for receiving the multi-modulation-format compatible high-speed laser signal proposed in the present disclosure realize the improvement of communication system compatibility and data rate scalability at the relay node of the laser information network, and simultaneously are beneficial to realization of the control on the volume, weight, power consumption and price cost of a laser receiving terminal.

(2) The present disclosure adopts the optical switch, the optical delay interferometer I and an optical delay interferometer Q arranged in parallel to realize reception and demodulation of a high-speed laser signal compatible with 5 laser communication systems such as IM, BPSK, DPSK, QPSK and DQPSK, which greatly increases a sharing rate of core devices and greatly reduces complexity of receiving terminals compatible with multiple communication systems.

(3) The present disclosure adopts the anti-coding switch unit in cooperation with two parallel optical delay interferometers to achieve compatible demodulation of BPSK and QPSK modulation formats, which requires no phase-lock mechanism, and has significant advantages of high device maturity, simple loop control, low engineering implementation risk, etc.

(4) The present disclosure adopts the two parallel optical delay interferometers to realize analog demodulation of a high-speed laser signal compatible with 4 kinds of phase modulation laser communication systems, and a data demodulation rate thereof is also adaptive and compatible. That is, adaptive analog demodulation can be performed on phase-modulated laser signals with different data rates (such as 1.25 Gbit/s, 2.5 Gbit/s or even 10 Gbit/s), so that the compatibility of a high-speed laser communication receiver is further improved.

DETAILED DESCRIPTION OF THE EMBODIMENTS

Figure 1:
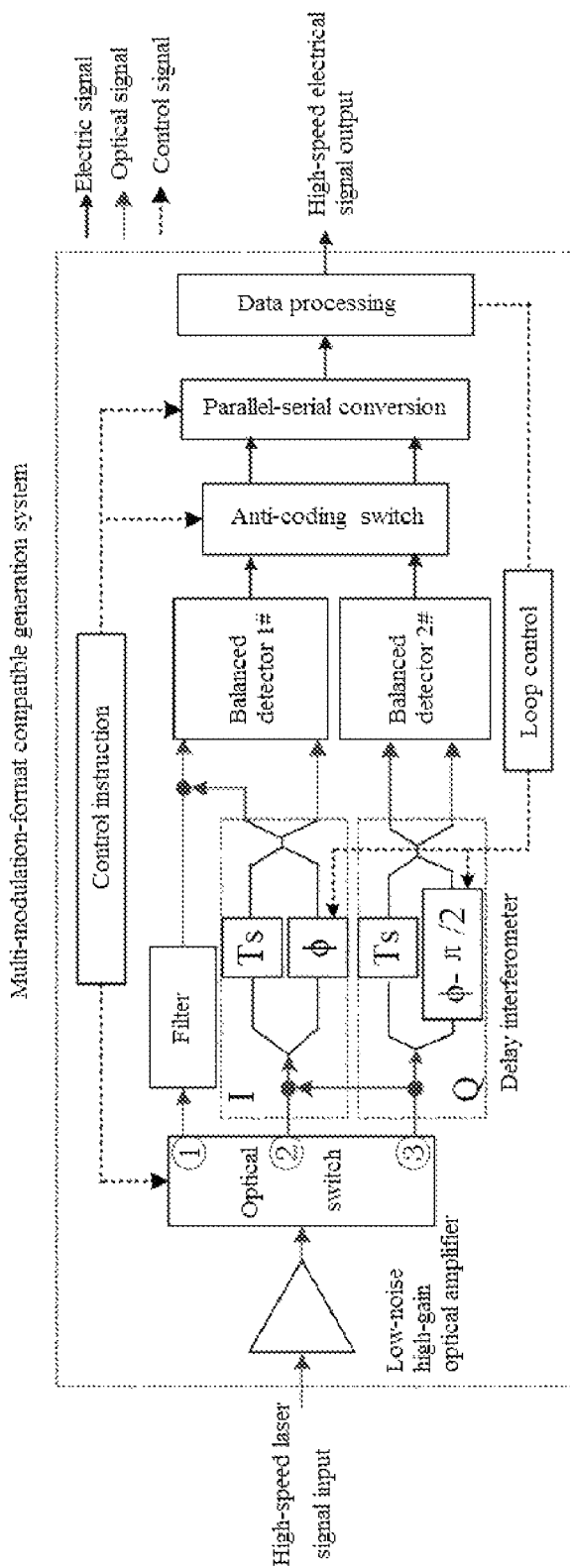
FIG. 1 is a schematic diagram of the principle of a system of the present disclosure.

Referring to a schematic diagram of the principle of an embodiment of a system shown in FIG. 1, a specific system structure of the embodiment mainly includes a control instruction unit, a low-noise high-gain optical amplifier, an optical switch, a filter, an optical delay interferometer I, an optical delay interferometer Q, a balanced detector 1 # (i.e., a first balanced detector), a balanced detector 2 # (i.e., a second balanced detector), an anti-coding switch unit, a parallel-serial conversion unit, a data processing unit and a loop control unit, wherein the control instruction unit is connected to the optical switch, the anti-coding switch unit, and the parallel-serial conversion unit, respectively;

the optical delay interferometer I and the optical delay interferometer Q are arranged in parallel;

a high-speed laser signal is input to the optical switch through the low-noise high-gain optical amplifier;

the optical switch includes a port (1) (i.e., a first output port), a port (2) (i.e., a second output port), and a port (3) (i.e., a third output port), wherein the port (1) is connected to the filter, the port (2) is connected to the optical delay interferometer I, and the port (3) is connected to the optical delay interferometer I and the optical delay interferometer Q respectively through a coupler;

the filter is connected to one input port of the balanced detector 1 # (i.e., the first balanced detector), two output ports of the optical delay interferometer I are connected to two input ports of the balanced detector 2 #, and two output ports of the optical delay interferometer Q are connected to two input ports of the balanced detector 2 #;

the balanced detector 1 # and the balanced detector 2 # output electrical signals sequentially through the anti-coding switch unit, the parallel-serial conversion unit, and the data processing unit;

a phase shift difference between the optical delay interferometer I and the optical delay interferometer Q is $$\frac{\pi}{2};$$

and the data processing unit is respectively connected to the optical delay interferometer I and the optical delay interferometer Q through the loop control unit.

Main parameters of each device in the embodiment are as follows:

1. the low-noise high-gain optical amplifier is a 1550 nm band optical amplifier with a noise coefficient ≤4.5 dB and a gain ≥40 dB;

2. the optical switch is a 1×3 type 1550 nm band optical switch device, and is capable of transparently transmitting an input optical signal to any designated output port according to a modulation format instruction;

3. the filter is a 1550 nm band pass optical filter with tunable center wavelength and filter bandwidth;

4. the optical delay interferometer I and the optical delay interferometer Q are 1550 nm band 1-bit optical delay interferometers; and 5. the balanced detector 1 # and the balanced detector 2 # are 1550 nm band optical balanced detectors.

Through the above introduction to the system structure, a method for receiving a signal using the embodiment is now described, which specifically includes the steps as follows.

1. A control instruction unit sends corresponding modulation instructions to an optical switch, an anti-coding switch unit, and a parallel-serial conversion unit according to modulation formats of required high-speed laser signals;

2. A low-noise high-gain optical amplifier performs optical power enhancement with a noise coefficient less than 4.5 dB (inclusive) and a power gain greater than 40 dB (inclusive) on input 1550 nm band high-speed laser signals, and outputs high-speed laser signals; and 3. After receiving the modulation instruction generated in the step 1, the optical switch selects output ports for the 1550 nm band high-speed laser signals generated in the step 2.

A specific process is as follows: if the received modulation format instruction is IM, a port (1) is used for outputting; if the received modulation format instruction is one of BPSK and DPSK, a port (2) is used for outputting; and if the received modulation format instruction is one of QPSK and DQPSK, a port (3) is used for outputting.

4. Referring to FIG. 1, a multi-system compatible demodulation process is as follows:

4.1 for an IM modulation format, the filter performs band-pass filtering on the 1550 nm band high-speed laser signal output from the port (1) in the step 3, and outputs a high-speed laser signal subjected to band-pass filtering after out-of-band noise removal;

4.2 for BPSK and DPSK modulation formats, the optical delay interferometer I performs 1-bit delay interference demodulation on the 1550 nm band high-speed laser signal output from the port (2) in the step 3, and converts phase modulation information into intensity information and outputs the intensity information;

4.3 for QPSK and DQPSK modulation formats, the 1550 nm band high-speed laser signal output from the port (3) in the step 3 is input through a coupler to the optical delay interferometer I and the optical delay interferometer Q for 1-bit delay interference demodulation respectively, and phase modulation information is converted into intensity information and the intensity information is output.

Figure 2:
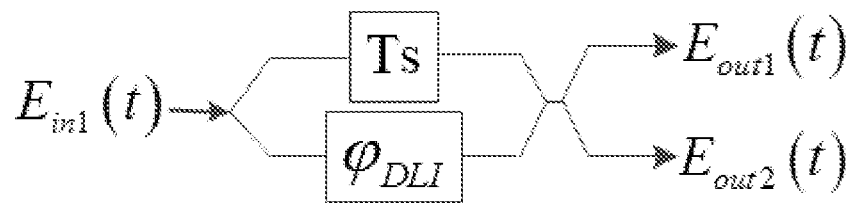
FIG. 2 is a schematic diagram of the demodulation principle of an optical delay interferometer.

It needs to be emphasized that the principle of the optical delay interferometers is as follows:

as shown in FIG. 2, the optical delay interferometers (DLI) divide input signal light into two paths with a 3 dB beam splitter, wherein one path of signal light is delayed by a symbol time $T_S$, and the other path of signal light gets a phase shift $\varphi_{DLI}$; then the two paths of signal lights are coupled through a 3 dB coupler and then output; the 3 dB coupler introduces a phase shift of 180° between upper and lower optical paths coupled therethrough; when a signal $E_{in1}$ is input at an input end of the DLI, the following can be obtained at an output end of the DLI:

$$E_{out1}=\tfrac{1}{2}E_{in1}(t-Ts)-\tfrac{1}{2}E_{in1}(t)e^{j\varphi_{DLI}}$$

$$E_{out2}=j\tfrac{1}{2}E_{in1}(t-Ts)+j\tfrac{1}{2}E_{in1}(t)e^{j\varphi_{DLI}}.$$

Assuming that an amplitude of an input signal is a (t), a modulation phase is φ(t), and a phase noise of a laser is $\varphi_{ns}(t)$, an output optical power of the input signal $E_{in1}=\sqrt{P_s}e^{j(\omega_s t+\varphi_s)}\square a(t)\square e^{j\varphi(t)}\square e^{j\varphi_{ns}(t)}$ after passing through the DLI can be expressed as the following expressions:

$$P_{out1}=E_{out1}(t)\square E_{out1}*(t)=\tfrac{1}{4}P_s\square a^2(t)+\tfrac{1}{4}P_s\square a^2(t-Ts)-\tfrac{1}{2}P_s\square a(t)a(t-Ts)\cos[\Delta\varphi(t)+\Delta\varphi_{ns}(t)+\varphi_{DLI}]$$

$$P_{out2}=E_{out2}(t)\square E_{out2}*(t)=\tfrac{1}{4}P_s\square a^2(t)+\tfrac{1}{4}P_s\square a^2(t-Ts)-\tfrac{1}{2}P_s\square a(t)a(t-Ts)\cos[\Delta\varphi(t)+\Delta\varphi_{ns}(t)+\varphi_{DLI}],$$

wherein Δφ(t)=φ(t)−φ(t−TS) is a modulation phase difference between two adjacent bits, $\Delta\varphi_{ns}(t)=\varphi_{ns}(t)-\varphi_{ns}(t-TS)$ is a phase change caused by a phase noise of a laser, and an amplitude of phase modulation needs to be kept as a constant, that is a(t)=a(t−Ts). It can be seen from the power expression that phase modulation information Δφ(t) can be obtained through the output signal of the DLI under the condition that the phase noise of the laser is ignored.

Figure 3:
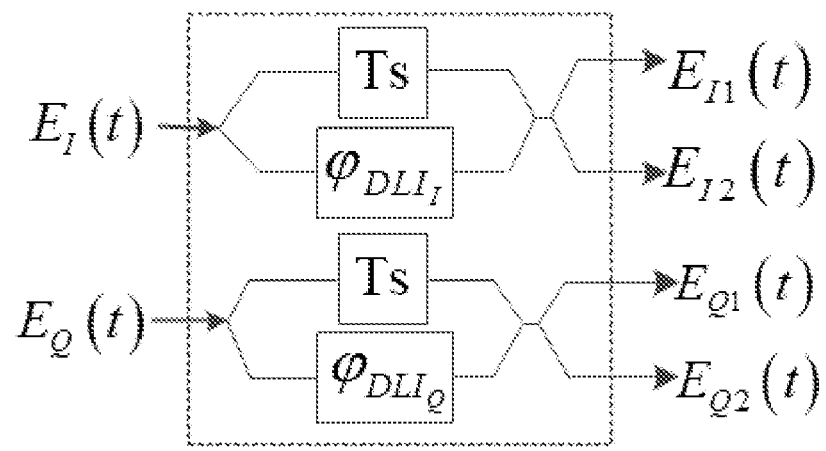
FIG. 3 is a schematic diagram of the demodulation principle after an optical delay interferometer I and an optical delay interferometer Q are connected in parallel.

As shown in FIG. 3, if the two optical delay interferometers are connected in parallel and marked as a path I and a path Q respectively, there is a 90° phase difference between input optical fields of the path I and the path Q.

$$E_I(t)=\tfrac{1}{2}a(t)\sqrt{P_s}e^{j(\omega_s t+\varphi_s)}e^{j\varphi(t)}\cdot e^{j\varphi_{ns}(t)}e^{j90°}$$

$$E_Q(t)=\tfrac{1}{2}a(t)\sqrt{P_s}e^{j(\omega_s t+\varphi_s)}e^{j\varphi(t)}\cdot e^{j\varphi_{ns}(t)}e^{j180°}.$$

According to transmission properties of the DLI mentioned above, two output optical fields of the path I are as the following expressions:

$$E_{I1}(t)=\tfrac{1}{4}a(t-T_s)\sqrt{P_s}e^{j(\omega_s t+\varphi_s)}e^{j\varphi(t-T_s)}\cdot e^{j\varphi_{ns}(t-T_s)}e^{j90°}+\tfrac{1}{4}a(t)\sqrt{P_s}e^{j(\omega_s t+\varphi_s)}e^{j\varphi(t)}\cdot e^{j\varphi_{ns}(ts)}e^{-j90°}e^{j\varphi_{DLI1}}$$

$$E_{I2}(t)=\tfrac{1}{4}a(t-T_s)\sqrt{P_s}e^{j(\omega_s t+\varphi_s)}e^{j\varphi(t-T_s)}\cdot e^{j\varphi_{ns}(t-T_s)}e^{j180°}+\tfrac{1}{4}a(t)\sqrt{P_s}e^{j(\omega_s t+\varphi_s)}e^{j\varphi(t)}\cdot e^{j\varphi_{ns}(ts)}e^{-j180°}e^{j\varphi_{DLI1}}$$

wherein $\varphi_{DLI1}$ is a phase shift component of the path I of the DLI, a photocurrent corresponding to the above expression can be expressed as the following expressions:

$$I_{I1}(t) = R \cdot E_{I1}(t)E_{I1}^*(t)$$
$$= \frac{R}{16}P_s \cdot a^2(t) + \frac{R}{16}P_s \cdot a^2(t-T_s) - \frac{R}{8}P_s a(t)a(t-T_s)\cos[\Delta\varphi(t)+\Delta\varphi_{ns}(t)+\varphi_{DLI1}]$$

$$I_{I2}(t) = R \cdot E_{I2}(t)E_{I2}^*(t)$$
$$= \frac{R}{16}P_s \cdot a^2(t) + \frac{R}{16}P_s \cdot a^2(t-T_s) + \frac{R}{8}P_s a(t)a(t-T_s)\cos[\Delta\varphi(t)+\Delta\varphi_{ns}(t)+\varphi_{DLI1}].$$

Similarly, Δφ(t) and $\Delta\varphi_{ns}(t)$ respectively represent a phase difference between adjacent modulation symbols and a phase error caused by a phase noise of a laser source. When a balanced detector is used for detection, photocurrents of two branches perform subtraction, and first two items of the above formula will cancel out, and an output photocurrent is finally obtained as the following expression:

$$I_I(t) = I_{I2}(t) - I_{I1}(t)$$
$$= \frac{R}{4}P_s a(t)a(t-T_s)\cos[\Delta\varphi(t)+\Delta\varphi_{ns}(t)+\varphi_{DLI1}].$$

According to same calculation steps, an output photocurrent of the path Q after photoelectric conversion of the balanced detector can be obtained as the following expression:

$$I_Q(t) = I_{Q2}(t) - I_{Q1}(t)$$
$$= \frac{R}{4}P_s a(t)a(t-T_s)\cos[\Delta\varphi(t)+\Delta\varphi_{ns}(t)+\varphi_{DLI_Q}],$$

wherein $\varphi_{DLI_Q}$ represents a phase shift component φ−π/2 of the path Q of the DLI. the influence of the phase noise of the laser source is ignored, and an output photocurrent is expressed as the following expressions:

$$I_I(t) = \frac{R}{4}P_s a(t)a(t-T_s)\cos[\Delta\varphi(t)+\varphi_{DLI_I}]$$

$$I_Q(t) = \frac{R}{4}P_s a(t)a(t-T_s)\cos[\Delta\varphi(t)+\varphi_{DLI_Q}].$$

It can be seen from the above expression that coherent data demodulation of quadrature phase modulation can be achieved by controlling phase shift components $\varphi_{DLI_I}$ and $\varphi_{DLI_Q}$ of the path I and the path Q of the DLI to be different values. Such principle is used herein to achieve demodulation of a satellite-borne high-speed laser signal compatible with multiple phase modulation communication systems based on two parallel 1-bit optical delay interferometers. For example, assuming that values of $\varphi_{DLI_I}$ and $\varphi_{DLI_Q}$ are −π/4 and −5π/4, respectively, coherent data demodulation of a DQPSK modulation mode can be realized.

5. A photoelectric conversion process is as follows:

5.1 for an IM modulation format, the 1550 nm band high-speed laser signal generated in the step 4.1 is photoelectrically converted into a high-speed electrical signal by a balanced detector 1 # and then the high-speed electrical signal is output;

5.2 for BPSK and DPSK modulation formats, a demodulated high-speed laser signal generated in the step 4.2 is photoelectrically converted into a high-speed electrical signal by the balanced detector 1 # and then the high-speed electrical signal is output; and 5.3 for QPSK and DQPSK modulation formats, a demodulated high-speed laser signal generated in the step 4.3 is photoelectrically converted into a high-speed electrical signal by the balanced detector 1 # and a balanced detector 2 # and then the high-speed electrical signal is output.

6. After receiving the modulation instruction generated in the step 1, the anti-coding switch unit performs anti-coding judgment and processing on a high-speed electrical signal generated in the step 5. The specific process is as follows: if the received modulation format instruction is one of BPSK and QPSK, the high-speed electrical signal generated in the step 5 is subjected to "exclusive OR" logic-based anti-coding processing and then output; and if a received modulation format instruction is one of IM, DPSK and DQPSK, transparent transmission is performed.

7. After receiving the modulation instruction generated in the step 1, the parallel-serial conversion unit performs parallel-serial conversion judgment and processing on high-speed electrical signal generated in the step 6. The specific process is as follows: if the received modulation format instruction is one of QPSK and DQPSK, two paths of parallel high-speed electrical signals generated in the step 6 are converted into one path of serial high-speed electrical signal and then the serial high-speed electrical signal is output; if the received modulation format instruction is one of IM, BPSK and DPSK, transparent transmission is performed.

8. A data processing unit performs clock extraction and data shaping on the high-speed electrical signal generated in the step 7, and then outputs a demodulated high-speed electrical signal with good quality.

9. A loop control unit uses the high-speed electrical signal generated in the step 8 as a feedback control signal to control phase shifts of the optical delay interferometer I and the optical delay interferometer Q so that a phase shift difference between the optical delay interferometer I and the optical delay interferometer Q is maintained to be $$\frac{\pi}{2}$$

all the time. Therefore, the relationship of phase difference deviating $$\frac{\pi}{2}$$

between the optical delay interferometer I and the optical delay interferometer Q due to external heat, vibration, mismatch of the optical signal transmission paths, and other reasons is avoided, and thus the method is more suitable for actual production work.

It can be seen that the control instruction unit realizes demodulation of the high-speed laser signal compatible with five modulation formats of IM, BPSK, DPSK, QPSK, and DQPSK by controlling the optical switch and the phase difference between the optical delay interferometer I and the optical delay interferometer Q, and a complex phase lock mechanism is not required.

The above embodiments show that the phase-lock-free mechanism for receiving the multi-modulation format compatible high-speed laser signal according to the present disclosure realizes the reception and demodulation of high-speed laser signals compatible with five modulation formats of IM, BPSK, DPSK, QPSK, and DQPSK. By controlling the combination of different parameters, the sharing rate of the core devices is increased, the modulation format compatibility of the communication system is expanded, and the complexity of the system implementation and a number of devices are greatly reduced. When applied to a relay node of a high-speed laser communication network, the system and the method not only ensure the improvement of compatibility and scalability, but also save the upgrade price and resource cost of an existing laser communication system.

The invention claimed is:

1. A phase-lock-free system for receiving a multi-modulation-format compatible high-speed laser signal, comprising a control instruction unit, a low-noise high-gain optical amplifier, an optical switch, a filter, an optical delay interferometer I, an optical delay interferometer Q, a first balanced detector, a second balanced detector, an anti-coding switch unit, a parallel-serial conversion unit, and a data processing unit, wherein the control instruction unit is connected to the optical switch, the anti-coding switch unit, and the parallel-serial conversion unit, respectively;

the optical delay interferometer I and the optical delay interferometer Q are arranged in parallel;

a high-speed laser signal is input to the optical switch through the low-noise high-gain optical amplifier;

the optical switch comprises a first output port, a second output port, and a third output port, the first output port is connected to the filter, the second output port is connected to the optical delay interferometer I, and the third output port is connected to the optical delay interferometer I and the optical delay interferometer Q through a coupler, respectively;

the filter is connected to one input port of the first balanced detector, two output ports of the optical delay interferometer I are connected to two input ports of the first balanced detector, and two output ports of the optical delay interferometer Q are connected to two input ports of the second balanced detector;

the first balanced detector and the second balanced detector output electrical signals sequentially through the anti-coding switch unit, the parallel-serial conversion unit, and the data processing unit; and a phase shift difference between the optical delay interferometer I and the optical delay interferometer Q is $$\frac{\pi}{2}.$$

2. The phase-lock-free system for receiving the multi-modulation-format compatible high-speed laser signal according to claim 1, further comprising a loop control unit, wherein the data processing unit is respectively connected to the optical delay interferometer I and the optical delay interferometer Q through the loop control unit.

3. The phase-lock-free system for receiving the multi-modulation-format compatible high-speed laser signal according to claim 2, wherein the low-noise high-gain optical amplifier is a 1550 nm band optical amplifier with a noise coefficient ≤4.5 dB and a gain ≥40 dB;

the optical switch is a 1×3 type 1550 nm band optical switch device, and is capable of transparently transmitting an optical signal input therein to any designated output port according to a modulation format instruction;

the filter is a 1550 nm band pass optical filter with tunable center wavelength and filter bandwidth;

the optical delay interferometer I and the optical delay interferometer Q are 1550 nm band 1-bit optical delay interferometers; and the first balanced detector and the second balanced detector are 1550 nm band optical balanced detectors.

4. A phase-lock-free method for receiving a multi-modulation-format compatible high-speed laser signal based on the phase-lock-free system for receiving the multi-modulation-format compatible high-speed laser signal according to claim 1, comprising the following steps:

【1】 sending corresponding modulation instructions to an optical switch, an anti-coding switch unit, and a parallel-serial conversion unit by a control instruction unit according to a modulation format of a required high-speed laser signal;

【2】 performing low-noise-coefficient and high-power-gain optical power enhancement processing on input high-speed laser signals by a low-noise high-gain optical amplifier;

【3】 after receiving the modulation instruction generated by the control instruction unit, selecting output ports for the high-speed laser signals processed in the step 【2】 by the optical switch and transparently transmitting the high-speed laser signals;

【4】 selecting a filter or an optical delay interferometer I or an optical delay interferometer Q to perform information demodulation on high-speed laser signals in different modulation formats output by different output ports in the step 【3】;

【5】 receiving the high-speed laser signals in different modulation formats after demodulation in the step 【4】, and performing photoelectric conversion on the high-speed laser signals by selecting a first balanced detector or a second balanced detector to form a high-speed electrical signal;

【6】 after receiving the modulation instruction generated by the control instruction unit, performing anti-coding judgment on the high-speed electrical signal generated in the step 【5】 by the anti-coding switch unit and transmitting a high-speed electrical signal subjected to anti-coding judgment to the parallel-serial conversion unit;

【7】 after receiving the modulation format instruction generated by the control instruction unit, performing parallel-serial conversion judgment on the high-speed electrical signal by the parallel-serial conversion unit and transmitting the high-speed electrical signal subjected to parallel-serial conversion judgment to the data processing unit for processing; and 【8】 performing clock extraction and data shaping on the high-speed electrical signal generated in the step 【7】 by the data processing unit, and then outputting a demodulated high-speed electrical signal with good quality.

5. The phase-lock-free method for receiving the multi-modulation-format compatible high-speed laser signal according to claim 4, further comprising a step 【9】, i.e., performing loop control,
specifically, controlling phase shifts of the optical delay interferometer I and the optical delay interferometer Q by using the high-speed electrical signal generated in the step 【7】 as a feedback control signal through a loop control unit to maintain a phase shift difference between the optical delay interferometer I and the optical delay interferometer Q to be π/2 all the time.

6. The phase-lock-free method for receiving the multi-modulation-format compatible high-speed laser signal according to claim 5, wherein
a specific process of the output port selection in the step 【3】 is as follows:
if the received modulation format instruction is IM, a first output port is used for outputting; if the received modulation format instruction is one of BPSK and DPSK, a second output port is used for outputting; and if the received modulation format instruction is one of QPSK and DQPSK, a third output port is used for outputting.

7. The phase-lock-free method for receiving the multi-modulation-format compatible high-speed laser signal according to claim 5, wherein
a specific selection condition for the information demodulation in the step 【4】 is as follows:
if a modulation format is an IM modulation format, band-pass filtering is performed through a filter;
if a modulation format is one of BPSK and DPSK modulation formats, 1-bit delay interference demodulation is performed through the optical delay interferometer I; and
if a modulation format is one of QPSK and DQPSK modulation formats, high-speed laser signals enter the optical delay interferometer I and the optical delay interferometer Q through a coupler, and the laser signals are subjected to 1-bit delay interference demodulation respectively.

8. The phase-lock-free method for receiving the multi-modulation-format compatible high-speed laser signal according to claim 5, wherein
a selection condition for the photoelectric conversion in the step 【5】 is as follows:
if an IM modulation format is received, photoelectric conversion is performed through one input port of the first balanced detector;
if one of BPSK and DPSK modulation formats is received, photoelectric conversion is performed through the first balanced detector; and
if one of QPSK and DQPSK modulation formats is received, photoelectric conversion is performed through the first balanced detector and the second balanced detector.

9. The phase-lock-free method for receiving the multi-modulation-format compatible high-speed laser signal according to claim 5, wherein
a process of the anti-coding judgment in the step 【6】 is as follows:
if the received modulation format instruction is one of BPSK and QPSK, "exclusive OR" logic-based differential anti-coding processing is performed and output is performed; and
if the received modulation format instruction is one of IM, DPSK and DQPSK, transparent transmission is performed.

10. The phase-lock-free method for receiving the multi-modulation-format compatible high-speed laser signal according to claim 5, wherein
a process of the parallel-serial conversion judgment in the step 【7】 is as follows:
if the received modulation format instruction is one of QPSK and DQPSK, two paths of input parallel high-speed electrical signals are converted into one path of serial high-speed electrical signal; and
if the received modulation format instruction is one of IM, BPSK and DPSK, transparent transmission is performed.

11. The phase-lock-free method for receiving the multi-modulation-format compatible high-speed laser signal according to claim 4, wherein
a specific process of the output port selection in the step 【3】 is as follows:
if the received modulation format instruction is IM, a first output port is used for outputting; if the received modulation format instruction is one of BPSK and DPSK, a second output port is used for outputting; and if the received modulation format instruction is one of QPSK and DQPSK, a third output port is used for outputting.

12. The phase-lock-free method for receiving the multi-modulation-format compatible high-speed laser signal according to claim 4, wherein
a specific selection condition for the information demodulation in the step 【4】 is as follows:
if a modulation format is an IM modulation format, band-pass filtering is performed through a filter;
if a modulation format is one of BPSK and DPSK modulation formats, 1-bit delay interference demodulation is performed through the optical delay interferometer I; and
if a modulation format is one of QPSK and DQPSK modulation formats, high-speed laser signals enter the optical delay interferometer I and the optical delay interferometer Q through a coupler, and the laser signals are subjected to 1-bit delay interference demodulation respectively.

13. The phase-lock-free method for receiving the multi-modulation-format compatible high-speed laser signal according to claim 4, wherein
a selection condition for the photoelectric conversion in the step 【5】 is as follows:
if an IM modulation format is received, photoelectric conversion is performed through one input port of the first balanced detector;
if one of BPSK and DPSK modulation formats is received, photoelectric conversion is performed through the first balanced detector; and
if one of QPSK and DQPSK modulation formats is received, photoelectric conversion is performed through the first balanced detector and the second balanced detector.

14. The phase-lock-free method for receiving the multi-modulation-format compatible high-speed laser signal according to claim 4, wherein
a process of the anti-coding judgment in the step 【6】 is as follows:
if the received modulation format instruction is one of BPSK and QPSK, "exclusive OR" logic-based differential anti-coding processing is performed and output is performed; and
if the received modulation format instruction is one of IM, DPSK and DQPSK, transparent transmission is performed.

15. The phase-lock-free method for receiving the multi-modulation-format compatible high-speed laser signal according to claim 4, wherein
a process of the parallel-serial conversion judgment in the step 【7】 is as follows:
if the received modulation format instruction is one of QPSK and DQPSK, two paths of input parallel high-speed electrical signals are converted into one path of serial high-speed electrical signal; and
if the received modulation format instruction is one of IM, BPSK and DPSK, transparent transmission is performed.

* * * * *